United States Patent
Filor

(10) Patent No.: US 7,373,447 B2
(45) Date of Patent: May 13, 2008

(54) MULTI-PORT PROCESSOR ARCHITECTURE WITH BIDIRECTIONAL INTERFACES BETWEEN BUSSES

(75) Inventor: Lutz Gerhard Eduard Filor, San Jose, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 0 days.

(21) Appl. No.: 10/890,346

(22) Filed: Nov. 9, 2004

(65) Prior Publication Data

US 2006/0101187 A1    May 11, 2006

(51) Int. Cl.
*G06F 13/00* (2006.01)
*G06F 13/36* (2006.01)
*G06F 13/42* (2006.01)

(52) U.S. Cl. .................. 710/305; 710/315

(58) Field of Classification Search ........... 710/305, 710/307, 315, 36, 104, 105; 700/82; 712/1, 712/32, 33; 370/276, 489, 419, 463, 395.5; 709/230, 220, 253; 714/13; 711/149
See application file for complete search history.

(56) References Cited

U.S. PATENT DOCUMENTS

| | | | | |
|---|---|---|---|---|
| 5,185,693 | A * | 2/1993 | Loftis et al. | 700/82 |
| 5,655,114 | A * | 8/1997 | Taniai et al. | 712/233 |
| 6,067,595 | A * | 5/2000 | Lindenstruth | 710/307 |
| 6,526,462 | B1 | 2/2003 | Elabd | |
| 6,601,126 | B1 | 7/2003 | Zaidi et al. | |
| 6,670,958 | B1 * | 12/2003 | Aleksic et al. | 345/502 |
| 6,731,652 | B2 * | 5/2004 | Ramfelt et al. | 370/489 |
| 2003/0009612 | A1 | 1/2003 | Latta | |
| 2003/0093655 | A1 | 5/2003 | Gosior et al. | |
| 2003/0120896 | A1 | 6/2003 | Gosior et al. | |
| 2003/0208611 | A1 * | 11/2003 | Weber et al. | 709/230 |

OTHER PUBLICATIONS

"Scalability port: a coherent interface for shared memory multiprocessors" by Azimi et al. (abstract only) Publication Date: Aug. 21-23, 2002.*

An Optimal Memor Allocation for Application-Specific Multiprocessor System-on-Chip,19-24, Samy Meftali et al, unknown date.

(Continued)

*Primary Examiner*—Gopal C. Ray
(74) *Attorney, Agent, or Firm*—Tucker Ellis & West LLP

(57) ABSTRACT

A multi-port processor architecture having a first bus, a second bus and a central processing unit. The central processing unit having a first and second ports coupled to first and second busses respectively. A first bus to second bus bi-directional interface couples the first bus to the second bus. Optionally, the first bus or the second bus can be connected to a memory. The architecture can include a third bus with a third bus to first bus bi-directional interface connecting the third bus to the first bus and a third bus to second bus bi-directional interface connecting the third bus to the second bus. If there are additional bus systems, the Nth port (where N is an integer greater than 2) is connected to the Nth port. The buses use bi-directional interfaces to communicate with each other without using CPU or memory resources, reducing memory access latency.

14 Claims, 8 Drawing Sheets

OTHER PUBLICATIONS

Performance Estimation of Multiple-Cache IP-Based Systems: Case Study of an Interdependency Problem an Dapplication of an Extended Shared Memory Model, 77-81, Sungjoo Yooet al, unknown date.

OPC International Partnership, 1-5, unknown date.

The A to Z of Soc's, 791-798, Reinaldo A. Bergamaschi et al, unknown date.

Software Hardware Nightmare or Bliss, Queue, Apr. 2003, 25-31, Telle Whitney, Ph.D, George Neville-Neil.

OCP-IP Compliance for Databahn Memory Controller Cores, D&R Industry Articles, 1-3, Nandan Nympally, unknown date.

32-Bit General Purpose Floating-Point Dual-Port Processor, Motorala, Inc. 1996.

System-on-Chip Byond the Nanometer Wall, 419-424, Philippe Magarshack, unknown date.

Validation in a Component-Based Design Flow for Mulicore Soc's, SLS Group, 162-166, Gabriela Nicolescu et al., unknown date.

Unifying Memory and Processor Wrapper Architecture in Multi-processor Soc Design, 26-31, Ferid Gharsalli, et al., unknown date.

Automatic Generation of Embedded Memory Wrapper for Mutiprocessor Soc, 596-601, Ferid Gharsalli, et al, unknown date.

* cited by examiner

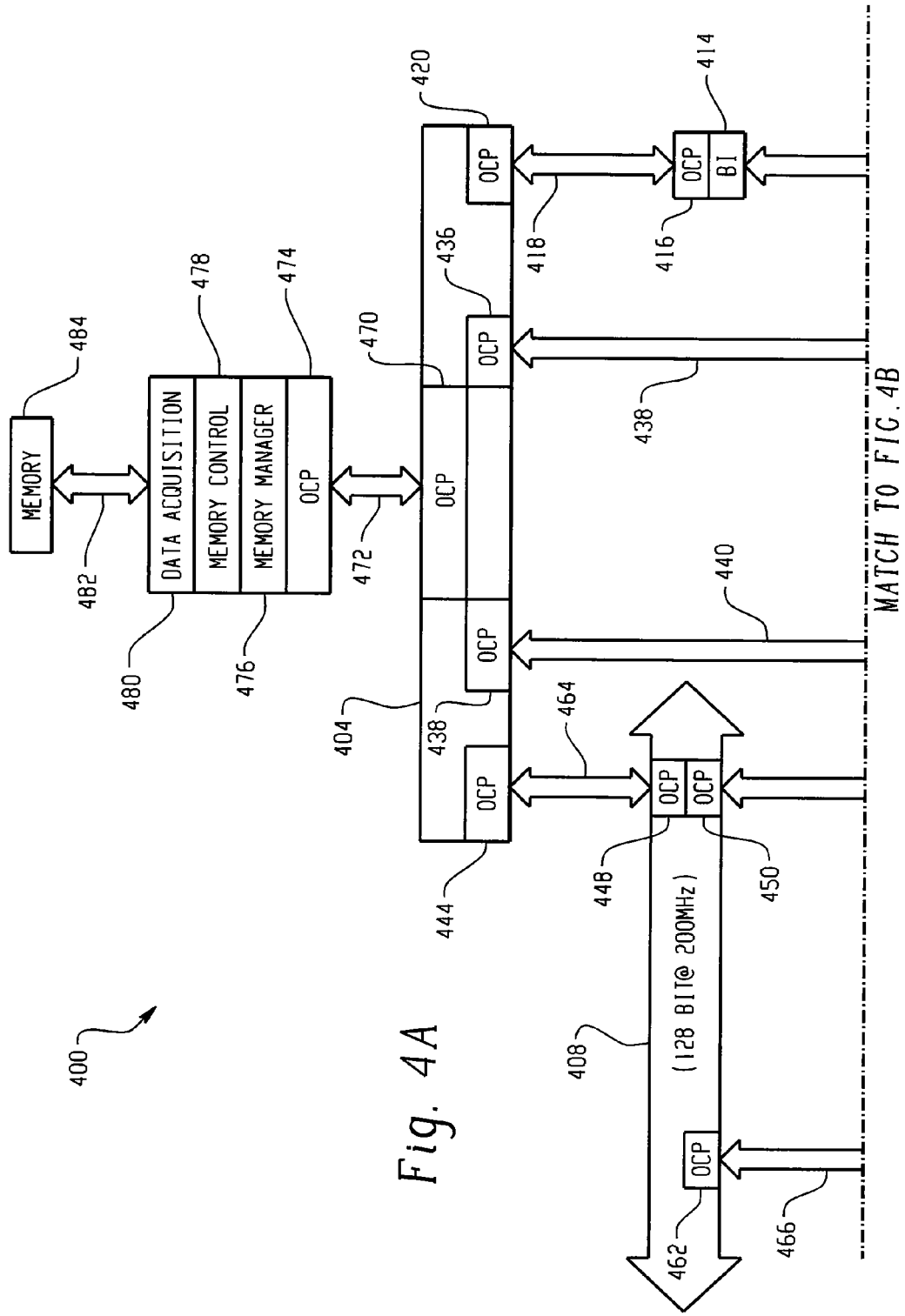

MULTI-PORT PROCESSOR ARCHITECTURE WITH BIDIRECTIONAL INTERFACES BETWEEN BUSSES

BACKGROUND OF THE INVENTION

The present invention relates generally to computer bus architectures and to system-on-a-chip architectures with multi-port processors, including but not limited to embedded processors, application specific integrated circuits (ASICS), Field Programmable Arrays (FPGAs) and other programmable devices.

System-on-a-chip (SoC) design allows a designer to create complex silicon systems from smaller working blocks or systems. By providing a method for easily supporting proprietary functionality in a larger context that in a larger context that includes many existing design pieces, SoC design facilitates the use of silicon design for many systems. There are three views of traffic for a design which are important to differentiate, a memory centric view, a processor centric view and an input/output (I/O) view. Traditionally, prior art systems tend to be processor centric and not balanced. It is desirable that an SoC does not compromise one view over another and provides equal optimization. If all three traffic aspects of an SoC are fully scaleable, the applications for this SoC can be unlimited.

The typical SoC design includes a central processing unit (CPU), memory and peripherals communicating over a fast bus (for the CPU and memory) and a slow bus (for the peripherals). Because the CPU, memory, and peripherals (when accessing memory) share the same bus, bus latency can be problematic. When using a single port processor, the processor must compete with the rest of the SoC system for the bus and memory resources. This latency can be even more problematic in hierarchical bus systems. For example a first peripheral can send data to a second peripheral by writing the data to memory, which is then read by the second peripheral. During the time data is being written or read, neither the CPU nor other peripherals can access the memory or the bus providing access to the memory. A bus arbiter can be employed to control access to the bus. However, the bus arbiter adds to the overhead in accessing the bus and can cause even more latency.

One solution to the aforementioned problems is to use larger caches. Another solution is to increase the clock speed (frequency) of the bus system. Yet another solution is to provide dedicated memory interfaces for the critical design parts of the SoC. However, these approaches are expensive. Furthermore, these approaches can introduce other problems, e.g. increasing the clock speed (frequency) of the system bus requires more power and generates additional heat.

There are three views of SoC traffic that should be differentiated, that is the memory centric view, the processor centric view, and the input/output (I/O) view. Preferably, a SoC doesn't compromise one view over another and provides equal optimization. The application for a SoC with equal optimization can be unlimited if all three traffic aspects are fully scaleable.

Thus it is desirable to minimize latency for accessing memory, while operating the memory bus at the lowest possible clock speed and yet provide a high data transfer rate.

BRIEF SUMMARY OF THE INVENTION

The present invention, in accordance with various aspects, is directed to a multi-port processor architecture. The multi-port processor can be employed by system on a chip (SoC) designs.

In accordance with an aspect of the present invention, there is described herein a multi-port processor architecture. The multi-port processor architecture comprising a first bus, a second bus, a central processing unit having a first port coupled to the first bus and a second port coupled to the second bus; and a first bus to second bus bi-directional interface. The first bus can be a memory interface (e.g., a multi-port memory interface "MMI"). The second bus can be a processor bus (e.g., a bus primarily used by the processor). Optionally, the first bus or the second bus can be connected to a memory. The architecture can further comprise a third bus with a third bus to first bus bi-directional interface connecting the third bus to the first bus and a third bus to second bus bi-directional interface connecting the third bus to the second bus.

In accordance with another aspect of the present invention, there is described herein a system on a chip architecture. The system on a chip architecture comprising a first bi-directional bus, a memory connected to the first bus, a second bi-directional bus, a central processing unit having a first port coupled to the first bi-directional bus and a second port coupled to the second bi-directional bus, and a first bi-directional bus to second bi-directional bus bi-directional interface.

Another aspect of the present invention described herein is directed to a method for implementing a system on a chip. The method comprises connecting a first bus to a first port of a central processing unit, connecting a second bus to a second port of the central processing unit, and connecting a first bi-directional interface to the first bus and the second bus.

In accordance with an aspect of the present invention, memory access latency can be reduced by using a dedicated channel to access the memory system. The present invention can be used with any memory interface. By using an open interface standard, such as Open Core Protocol (OCP), the present invention can be implemented without using new memory commands. The present invention can provide predictable memory access delays for a dedicated device, such as a processor and reduced latency by using priority handling and avoids bus latencies. The predictable low latency architectural approach of the present invention can reduces memory latency, and can reduce memory latency to less than thirty clock cycles, while not reducing memory bandwidth efficiency.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention, in accordance with various aspects, is directed to a multi-port processor architecture. The multi-port processor can be employed by system on a chip (SoC) designs to control the system aspects of the SoC.

Figure 1:
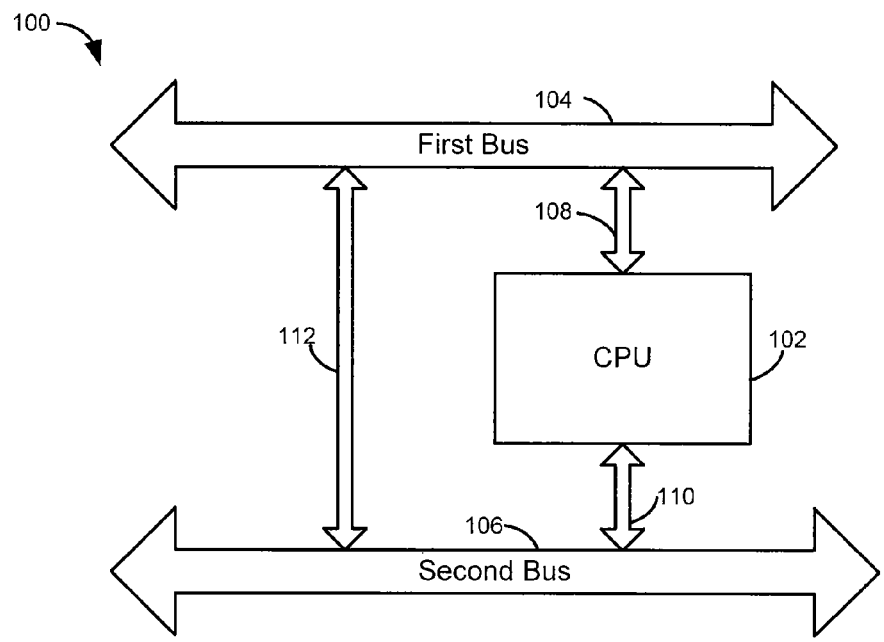
FIG. 1 is block diagram of a multi-port system in accordance with an aspect of the present invention.

Referring to FIG. 1, there is illustrated a system 100 in accordance with an aspect of the present invention. System 100 can be used for SoC designs. The system 100 comprises a CPU 102 that is coupled to a first bus 104 via a bi-directional interface 108. CPU 102 is also connected to a second bus 106 via bi-directional interface 110. A bi-directional interface 112, for example a bus bridge, is used to connect the first bus 104 to the second bus 106.

Optionally, bus 104 and/or bus 106 can be connected to a memory. For example, if a memory is coupled to the bus 104, then CPU 102 can use bi-directional interface 108 to communicate with the memory, and bi-directional interface 110 to communicate with peripherals or other devices coupled to bus 106. If a peripheral or device coupled to bus 106 wants to communicate with the memory, it can use bi-directional interface 112 to communicate with bus 104. Using bi-directional interface 112, bus 104 and bus 106 can communicate without using CPU 102, enabling CPU 102 to perform other tasks.

Additionally, peripherals or devices on bus 106 can communicate with each other using bus 106, bypassing the memory and bus 104. This reduces latency of accessing the memory on bus 104 by reducing the traffic on bus 104. Either the bus 104, and/or bus 106 can be bi-directional buses. Additional CPU's can be connected in parallel with CPU 102. Single port CPU's can be coupled to bus 104 or bus 106 and multi-port (dual in this case), CPU's can be coupled to bus 104 and bus 106. Communication with the buses (104 and 106) can be implemented using any protocol, such as Open Core Protocol (OCP™). OCP refers to a comprehensive interface socket for semiconductor intellectual property (IP) cores administrated by the OCP International Partnership Association, Inc. (OCP-IP), 5440 SW Westgate Dr., Suite 217, Portland, Oreg. 97221 (www.ocpip.org) and includes versions 1.0, 2.0 and subsequent versions.

Additional busses can be added. If there are additional bus systems, the Nth port (where N is an integer greater than 2) is connected to the Nth port.

Figure 2:
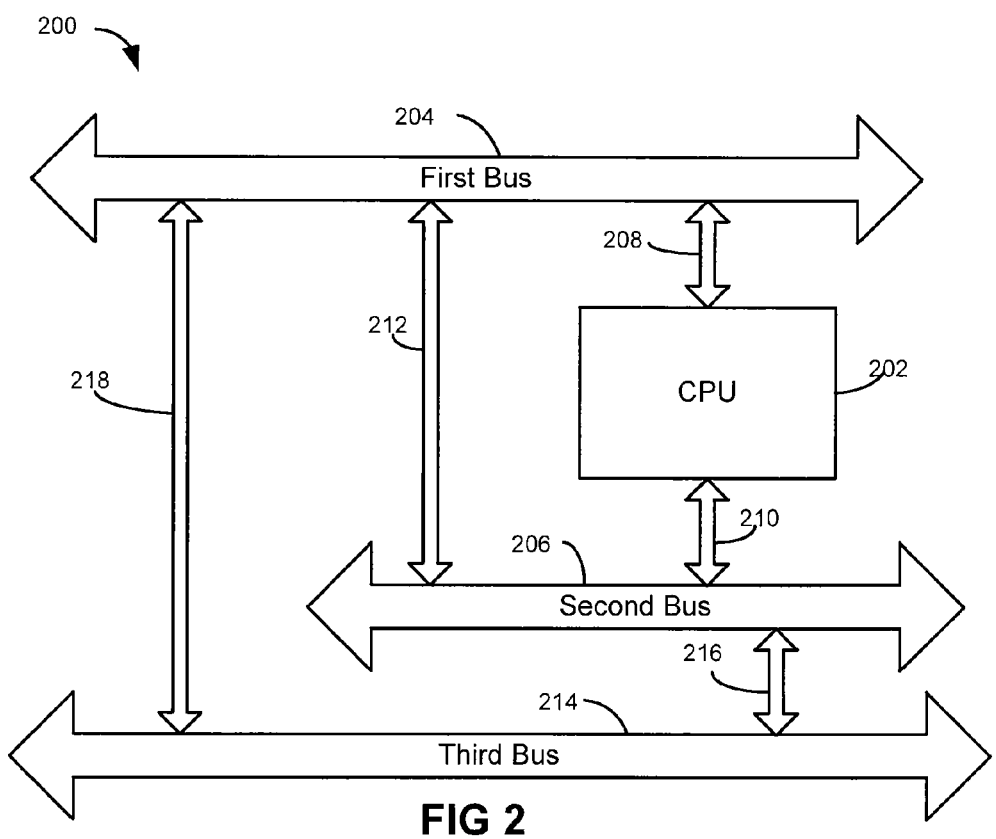
FIG. 2 is a block diagram of a multi-port system having an additional bus in accordance with an aspect of the present invention.

Referring now to FIG. 2, there is illustrated a system 200 in accordance with an aspect of the present invention. System 200 can be used for SoC designs. The system 200 comprises a CPU 202 that is coupled to a first bus 204 via a bi-directional interface 208. CPU 202 is also connected to a second bus 206 via bi-directional interface 210. A bi-directional interface 212 is used to connect the bus 204 to bus 206. The system 200 also has a third bus 214 that is not directly coupled to CPU 202. However, bus 214 is coupled to buses 204 and 206. Bus 214 is coupled to bus 204 via bi-directional interface 218 and to bus 206 via bi-directional interface 216.

Any one or more of bus 204, bus 206 and bus 214 can be coupled to a memory. For example, bus 204 can be coupled to a memory and busses 206 and 214 can be coupled to peripherals or other devices. If a device on second bus 206 wants to communicate with a device on third bus 214, the communication can take place directly between the devices using bus 206, bi-directional interface 216 and bus 214. The communication can occur without using memory, thus reducing the latency of the memory and reducing traffic on bus 204. If a device on bus 206 or a device on bus 214 wants to access the memory attached to bus 204, the device can use either bi-directional interface 216 or bi-directional interface 218 respectively. Additional CPU's can be connected in parallel with CPU 202. Single port CPU's can be coupled to bus 204 or bus 206 and multi-port (dual in this case), CPU's can be coupled to bus 204, bus 206 and/or bus 214. Communication with the buses can be implemented using any protocol, such as OCP. Bus 204, bus 206 and/or bus 214 can be bi-directional busses.

Figure 3:
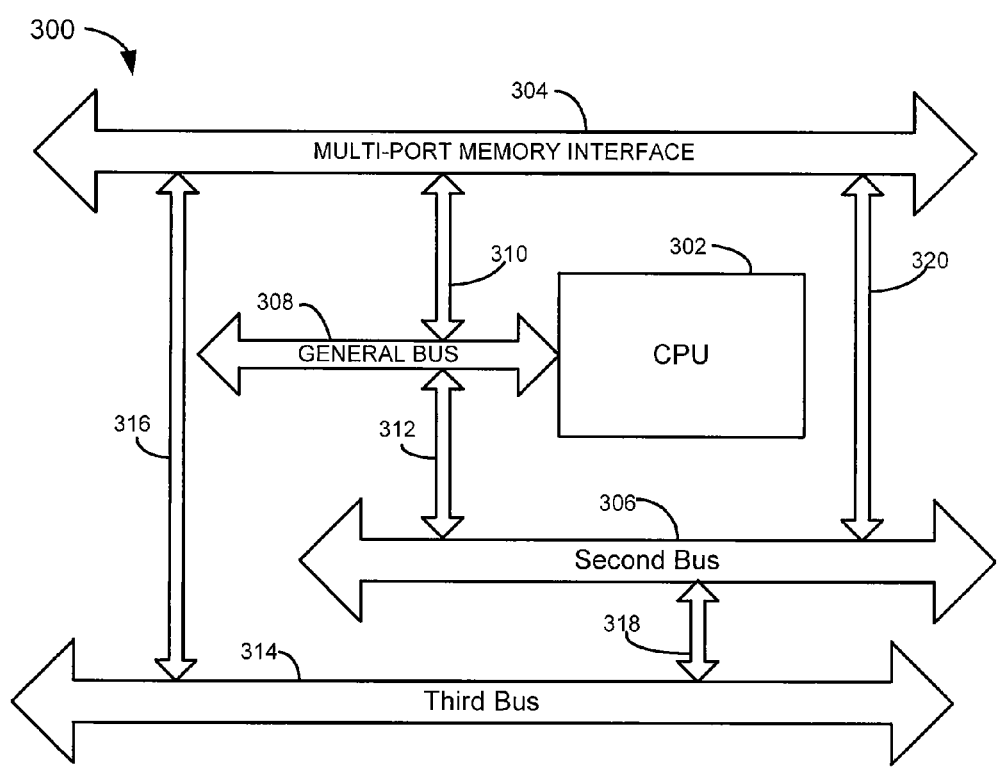
FIG. 3 is a block diagram of a hard macro implementation of a multi-port system in accordance with an aspect of the present invention.

Referring now to FIG. 3, there is illustrated a system 300 in accordance with an aspect of the present invention. System 300 is implemented using hard macros with a single port CPU and has a dedicated processor bus. System 300 can be used for SoC designs. The system 300 comprises a CPU 302 that is coupled to a multi-port memory interface (MMI) 304 via a direct memory access 310 that is connected to a general CPU bus 308. Alternatively, the multi-port memory interface 304 can be replaced by a wide bus to allow scalability and to increase the number of ports. A bus has the advantage of better span over the die area of a chip. Additional CPU's or system devices can be coupled to general CPU bus 308. CPU 302 is also connected to second bus (e.g., a processor bus) 306 via bi-directional interface 312 that is connected to general CPU bus 308 to reduce the memory latency for devices on bus 306. A direct memory access 320 is used to multi-port memory 304 to bus 306. The system 300 also has a third bus 314 that is not directly coupled to CPU 302. Third bus 314 is coupled to the other bus 306 and the multi-port memory 304. Third bus 314 is coupled to multi-port memory 304 via direct memory access 316 and to second bus 306 via bi-directional interface 318.

Any one or more of the bus 304, bus 306 and bus 314 can be coupled to a memory. For example, bus 304 can be coupled to a memory. Busses 306 and 314 can be coupled to peripherals or other devices. If a device on second bus 306 wants to communicate with a device on bus 314, the communication can take place directly between the devices using bus 306, bi-directional interface 318 and bus 314. The communication can occur without using memory, thus reducing the latency of the memory and reducing traffic on bus 304.

If a device on bus 306 or a device on bus 314 wants to access the memory attached to bus 304, the device can use either bi-directional interface 320 or bi-directional interface 316 respectively. Additional CPU's can be connected in parallel with CPU 202. Single port CPU's can be coupled to bus 204 and multi-port (dual in this case), CPU's can be coupled to bus 204 bus 206 and/or bus 214. Communication with the buses can be implemented using any protocol, such as OCP. Bus 304, bus 306 and/or bus 314 can be bi-directional busses.

Figure 8:
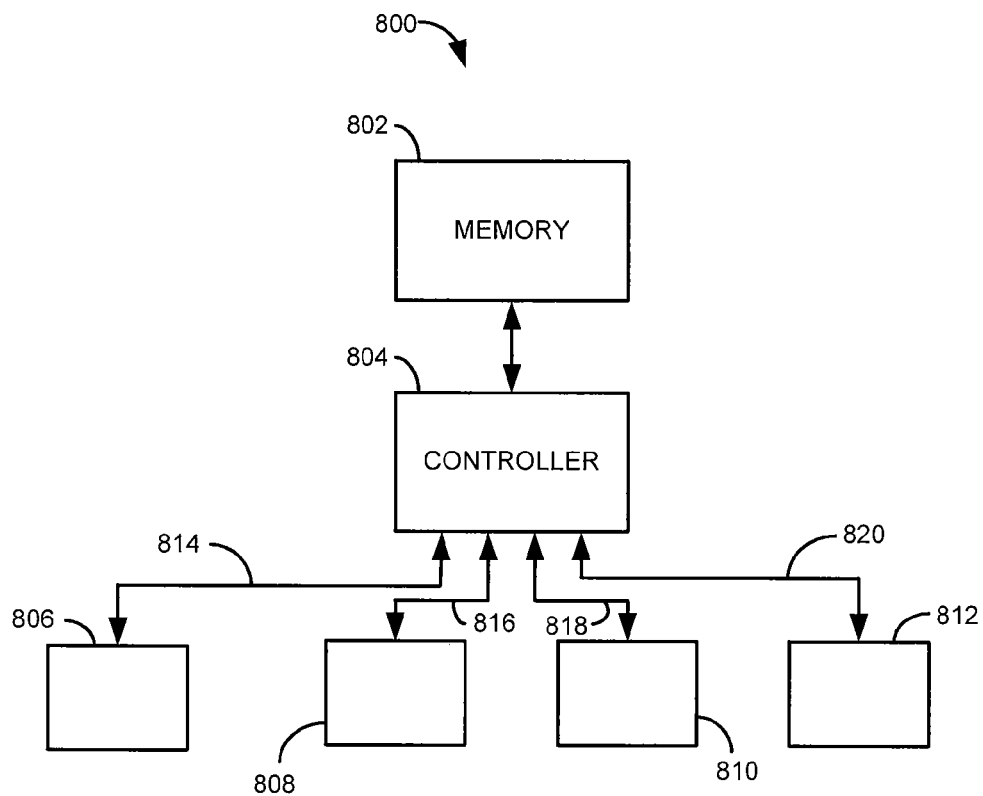
FIG. 8 illustrates a multi-port memory interface in accordance with an aspect of the present invention.

FIG. 8 illustrates a multi-port memory interface (MMI) 800 in accordance with an aspect of the present invention. Access to memory 802 is controlled by controller 804. A plurality of devices (such as processors) 806, 808, 810, 812 use direct memory accesses 814, 816, 818, 820 respectively to access memory 802 via controller 804.

Figure 4B:
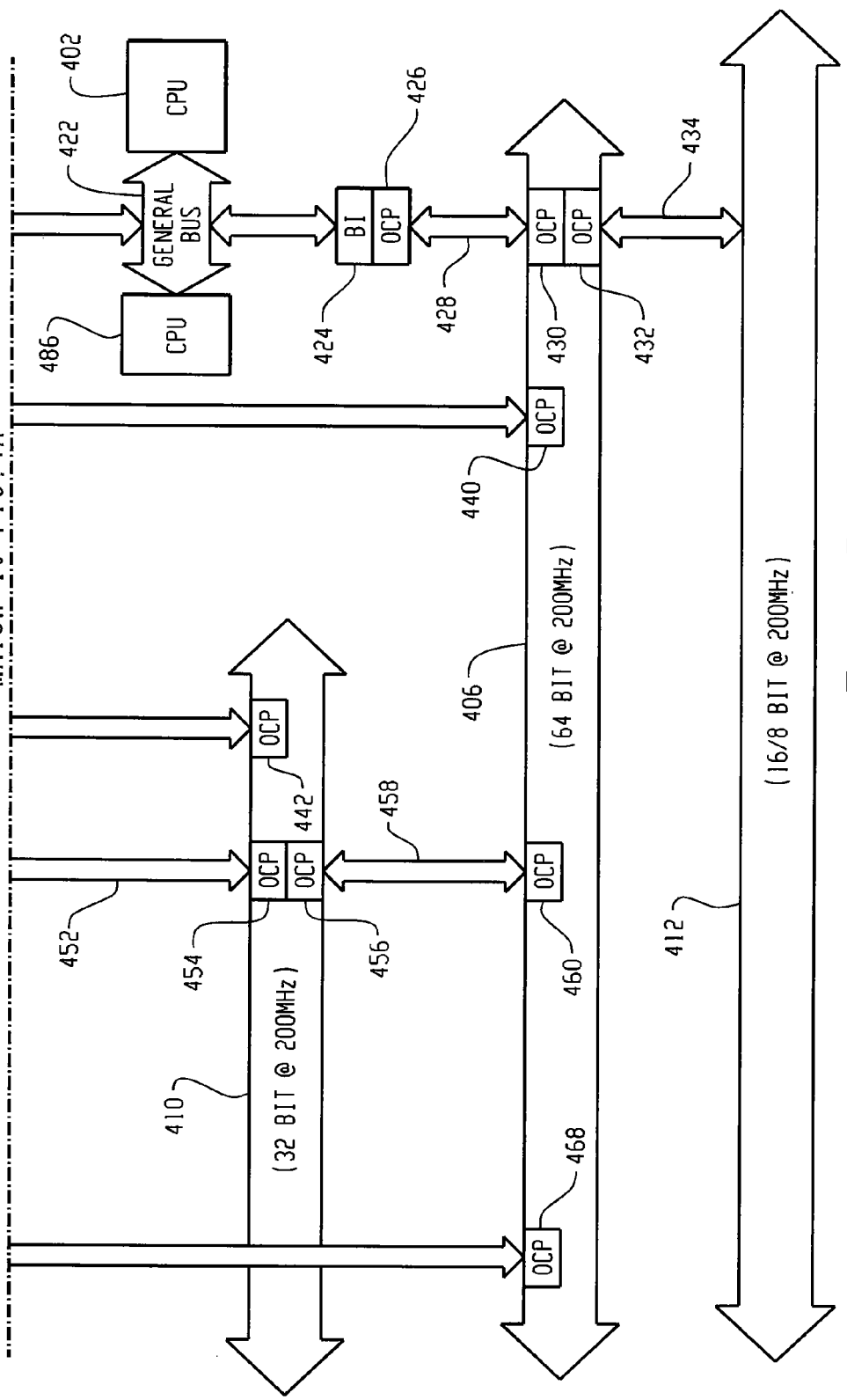
FIG. 4 is a block diagram of a hard macro implementation of a multi-port system employing five buses in accordance with an aspect of the present invention.

Referring now to FIG. 4, there is illustrated a block diagram of a hard macro implementation of a multi-port system 400 employing five buses in accordance with an aspect of the present invention. CPU 402 is connected to a general processor or system bus 422. From general processor or system bus 402, CPU 422 is connected to a multi-port memory interface 404, which can be a wide bus (fast pipe) and bus 406. The connection between general processor or system bus 422 and multi-port memory interface 404 is via a bi-directional interface comprising general processor or system bus interface 414, OCP interface 416 connection 418 and OCP interface 420. The connection between general processor or system bus 422 and bus 406 is via a bi-directional interface comprising general processor or system bus interface 424, OCP interface 426, connection 428 and OCP interface 430. Multi-port memory interface 404 is connected to bus 406 via a bi-directional interface comprising OCP interface 436, connection 438 and OCP interface 440. Bus 408 is connected to multi-port memory interface 404 via a bi-directional interface comprising OCP interface 448, connection 446 and OCP interface 444. Bus 408 is also connected to bus 406 via a bi-directional interface comprising OCP interface 462, connection 466 and OCP interface 468. In addition, bus 408 is coupled to bus 410 via a bi-directional interface comprising OCP interface 450, connection 452 and OCP interface 454. Bus 410 is coupled to multi-port memory interface 404 via a bi-directional interface comprising OCP interface 438, connection 440 and OCP interface 442. Bus 410 is coupled to bus 406 via a bi-directional interface comprising OCP interface 456, connection 458 and OCP interface 460. Bus 412 is connected to bus 406 via a bi-directional interface comprising OCP block 432 and connection 434. Memory access is provided from multi-port memory interface 404 to memory 484 via a bi-directional interface comprising OCP interface 470, connection 472, OCP interface 474, MemMax 476, Memory Control 478, Data Acquisition 480 and connection 482. Optionally, an additional CPU 486 can be connected to general processor or system bus 422.

In operation, when a CPU 402 or 482, wants to access memory 484 it is routed through multi-port memory interface 404. Because the other buses 406, 408 and 410 are inter-connected, devices connected to these buses can communicate directly to each other via buses 406, 408 and 410 without having to access memory 484 or multi-port memory interface 404. Devices connected to bus 412 can communicate directly to devices on buses 408 and 410 via bus 406. This results in reduced traffic on multi-port memory interface 404 and reduced latency for memory access. By using a protocol such as OCP, CPU's 402 and 486 or other devices do not have to be concerned with delivery of messages along the buses. This also enables the buses to be of varying buswidths. For example, multi-port memory interface 404 and 406 can be 64 bit buses, bus 408 a 128 bit bus, bus 410 a 32 bit bus, and bus 412 a 16 or 8 bit bus. The interface handles any formatting changes for the differing buswidths and frequencies. Furthermore, once a CPU 402 or 486, or other device sends a message, the protocol can handle delivery of the message, freeing the CPU 402 or 486 or other device to continue with other tasks.

As shown in FIG. 4, bus 408 is a 128 bit 200 MHZ bus, bus 410 is a 32 bit 200 MHZ bus, bus 406 is a 64 bit 200 MHZ bus and bus 412 is a 16/8 bit 200 MHZ bus. The bus parameters should not be construed as limiting, but merely as an example illustrative of the concept that the present invention is adaptable to work with busses having different bus-widths and operating speeds.

Figure 5A:
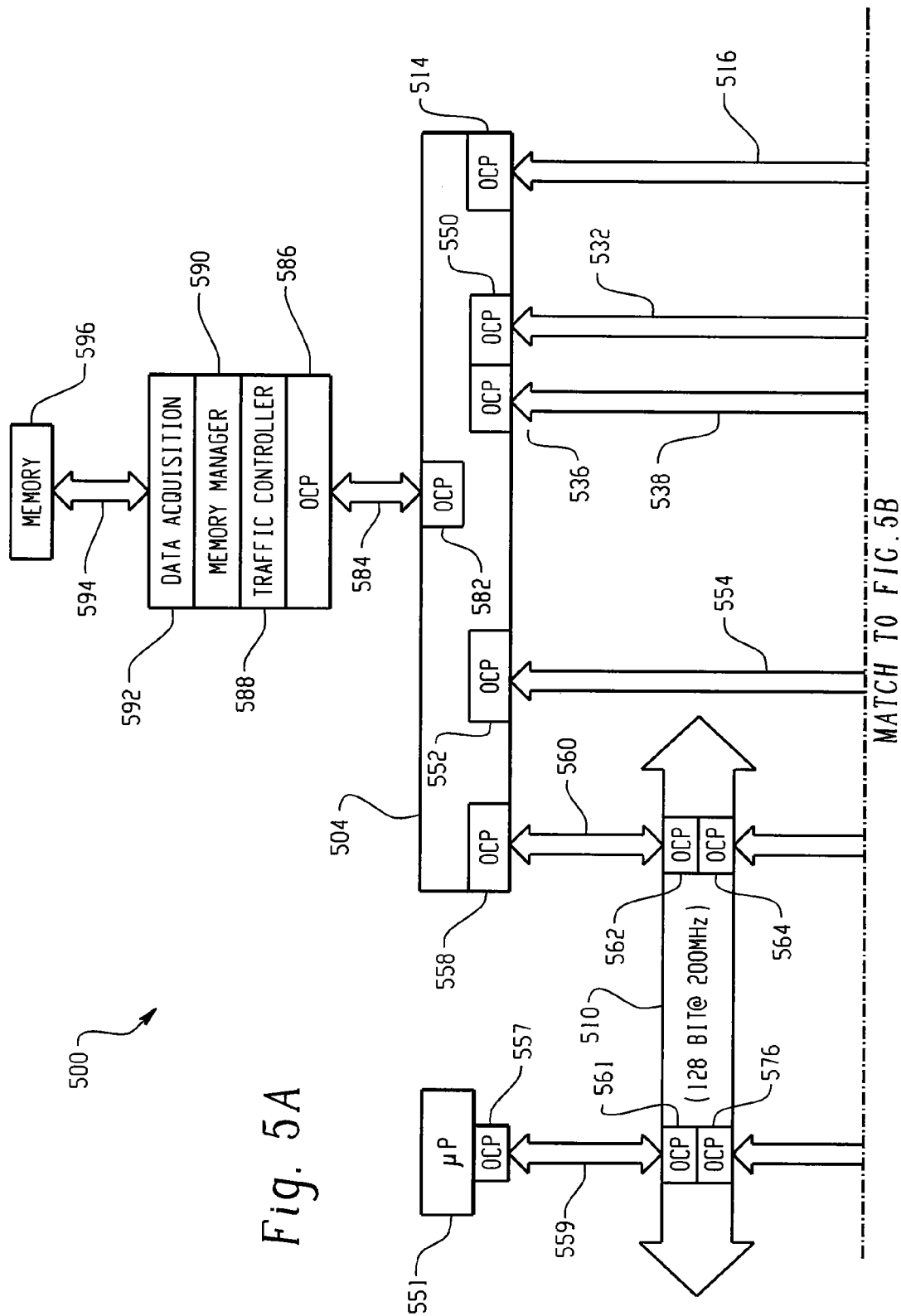
FIG. 5 is a block diagram of a synthesizable processor core implementation of a multi-port system employing five buses in accordance with an aspect of the present invention.
Figure 5B:
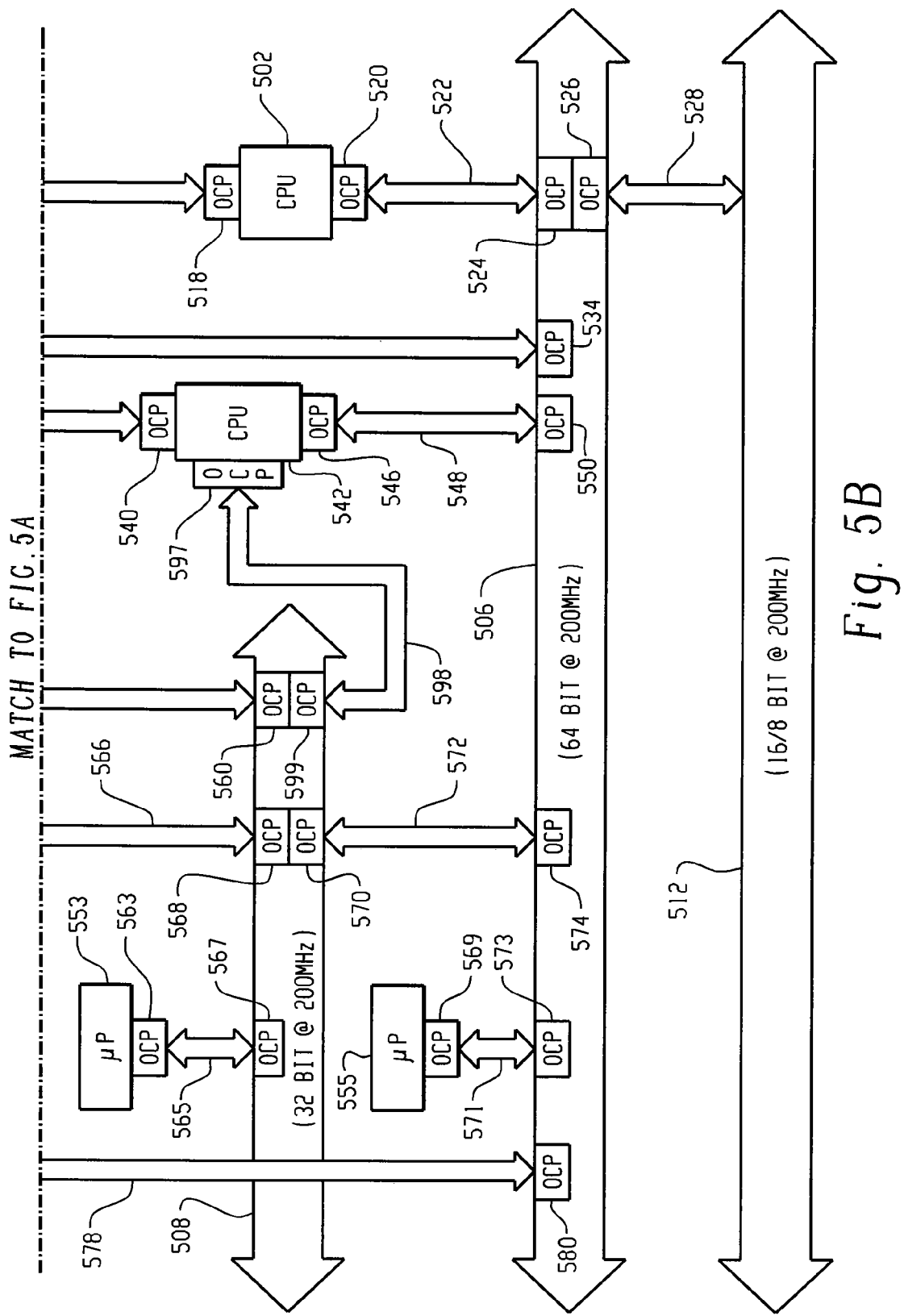

FIG. 5 is a block diagram of a synthesizable processor core implementation of a multi-port system 500 employing five buses in accordance with an aspect of the present invention. The system 500 can be used with SoC designs. CPU 502 is connected to is connected to multi-port memory interface 504 and bus 506. The connection between CPU 502 and multi-port memory interface 504 is via a bi-directional interface comprising OCP interface 518 connection 516 and OCP interface 514. The connection between CPU 502 and bus 506 is via a bi-directional interface comprising OCP interface 520, connection 522 and OCP interface 524. Multi-port memory interface 504 is connected to bus 506 via a bi-directional interface comprising OCP interface 530, connection 532 and OCP interface 534. Multi-port memory interface 504 is connected to bus 510 via a bi-directional interface comprising OCP interface 558, connection 560 and OCP interface 562. Bus 510 is connected to bus 506 via a bi-directional interface comprising OCP interface 576, connection 578 and OCP interface 580. Bus 510 is connected to bus 508 via a bi-directional interface comprising OCP interface 564, connection 566 and OCP interface 568. Bus 508 is connected to bus 506 via a bi-directional interface comprising OCP interface 570, connection 572 and OCP interface 574. Bus 508 is connected to multi-port memory interface 504 via a bi-directional interface comprising OCP interface 556, connection 554 and OCP interface 552. Bus 506 is connected to bus 512 via a bi-directional interface comprising OCP interface 526 and connection 528. Memory access is provided through multi-port memory interface 504 to memory 596 via a bi-directional interface comprising OCP interface 582, connection 584, OCP interface 586, Arbitrator, Traffic Controller (MemMax) 588, Memory Control 590, Data Acquisition 590 and connection 594.

Optionally, an additional CPU 542 can be used. As shown, CPU 542 is connected to multi-port memory interface 504 by a bi-directional interface comprising OCP interface 540, connection 538 and OCP interface 536; to bus 506 by a bi-directional interface comprising OCP interface 546, connection 548 and OCP interface 550; and to bus 508 by a bi-directional interface comprising OCP interface 597, connection 598 and OCP interface 599. Additional processors can be connected to any or all of the buses 506, 508, 510 and 512 as desired. For example, single port processors 551, 553, 555 are shown as connected to busses 510, 508, 506 respectively. Processor 551 is connected to bus 510 via OCP interface 557 connection 559 and OCP interface 561. Processor 553 is connected to bus 508 via OCP interface 563 connection 565 and OCP interface 567. Processor 555 is connected to bus 506 via OCP interface 569 connection 571 and OCP interface 573.

In operation, when a CPU, 502 or 546, wants to access memory 596 it is routed through multi-port memory interface 504. Because the other buses, 506, 508 and 510 are inter-connected, devices connected to these buses can communicate directly to each other via buses 506, 508 and 510 without having to access memory 596 or multi-port memory interface 504. Devices connected to bus 512 can communicate directly to devices on buses 508 and 510 via bus 506. This results in reduced traffic on multi-port memory interface 504 and reduced memory access latency. By using a protocol such as OCP, CPU's 502 and 546 or other devices do not have to be concerned with delivery of messages along the buses. This also enables the buses to be of varying buswidths. For example, multi-port memory interface 504 and 506 can be 64 bit buses, bus 510 a 128 bit bus, bus 508 a 32 bit bus, and bus 512 a 16 or 8 bit bus. The interface handles any formatting changes for the differing buswidths. Furthermore, once a CPU 502 or 546, or other device sends a message, the protocol can handle delivery of the message, freeing the CPU 502 or 546 or other device to continue with other tasks.

As shown in FIG. 5, bus 510 is a 128 bit 200 MHZ bus, bus 508 is a 32 bit 200 MHZ bus, bus 506 is a 64 bit 200 MHZ bus and bus 512 is a 16/8 bit 200 MHZ bus. The bus parameters should not be construed as limiting, but merely as an example illustrative of the concept that the present invention is adaptable to work with busses having different bus-widths and operating speeds.

Figure 6:
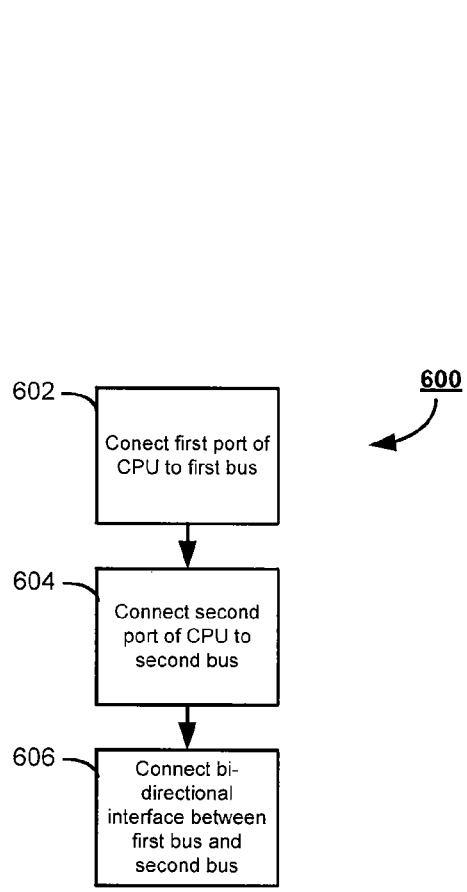
FIG. 6 is a block diagram of a method in accordance with an aspect of the present invention.
Figure 7:
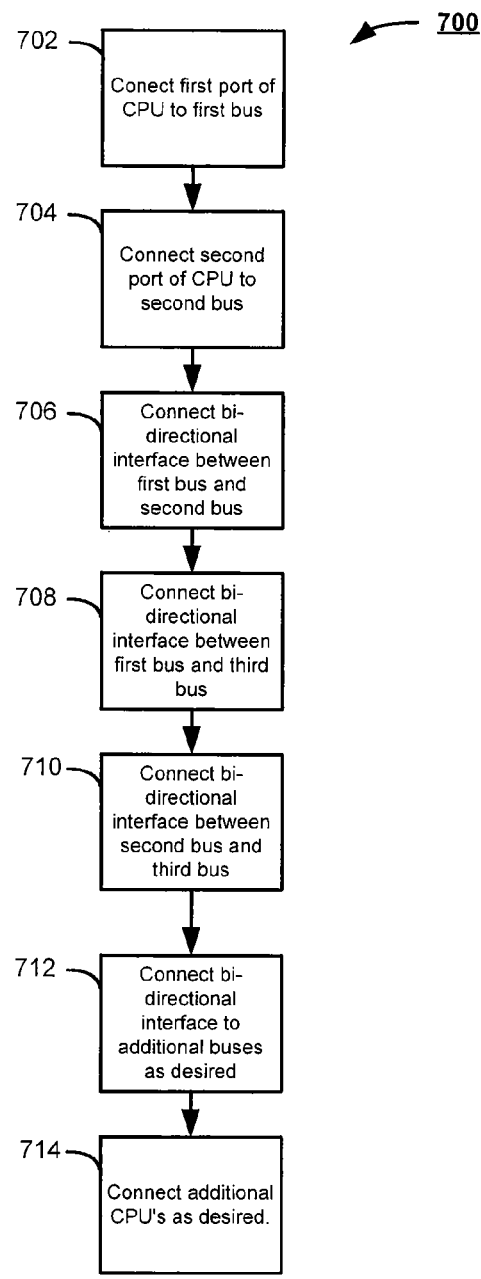
FIG. 7 is a block diagram of a method using an additional bus in accordance with an aspect of the present invention.

FIGS. 6 and 7 are directed to methodologies in accordance with various aspects of the present invention. Although the methodologies are illustrated as a sequence, the methodologies should not be construed to be limited to the order shown. Furthermore, unless otherwise explicitly stated, one or more of the acts described in the methodology can be executed simultaneously.

FIG. 6 is a block diagram of a method 600 in accordance with an aspect of the present invention. The method 600 is directed to an implementation of a multi-port processor architecture, which can be adaptable to SoC systems. At 602 a first port of a CPU is connected to a first bus. The first bus can be a memory bus or other system bus. At 604 a second port of the CPU is coupled to a second bus. The second bus can have similar properties to the first bus, or can have totally different properties. For example, the first bus can be a memory bus and the second bus can be a peripheral bus. For additional CPU's, 602 and/or 604 can be repeated. At 606 a bi-directional interface is connected between the first bus and the second bus. The bi-directional interface enables the first bus and second bus to communicate without using the CPU, freeing the CPU to work on other tasks.

FIG. 7 is a block diagram of a method 700 in accordance with an aspect of the present invention. The method 700 is directed to an implementation of a multi-port processor architecture using three or more buses, which can be adaptable to SoC systems.

At 702 a first port of a CPU is connected to a first bus. The first bus can be a memory bus or other system bus. At 704 a second port of the CPU is coupled to a second bus. The second bus can have similar properties to the first bus, or can have totally different properties. For example, the first bus can be a memory bus and the second bus can be a peripheral bus. At 706 a bi-directional interface is connected between the first bus and the second bus. The bi-directional interface enables the first bus and second bus to communicate without using the CPU, freeing the CPU to work on other tasks. At 708, a bi-directional interface is connected between the first bus and the third bus. This enables the third bus to communicate with the first bus without using CPU resources. At 710, a bi-directional interface is connected between the second bus and the third bus. If, for example, the first bus is connected to memory, by connecting the third bus to the second bus, devices or peripherals on the second and third buses can communicate with one another without requiring access to memory, thus reducing latency and bus traffic on the bus containing the memory. At 712, a bi-directional interface is used to connect any additional buses as desired. For example, if one bus is added (a third bus), then a bi-directional interface can be used to connect the third bus to either the first bus, the second bus or to both the first and second bus. If two buses are added (a third and fourth bus), then the third bus can be connected to at least one of the first or second bus, while the fourth bus can be connected to at least one of the first, second, and third bus. At 714 additional CPU's are connected as desired. Single port CPU's can be connected to any bus. Multi-port CPU's can be connected to any one or more buses as desired.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A multi-port processor architecture, comprising:
a first bus;
a second bus;
a central processing unit having a first port coupled to the first bus and a second port coupled to the second bus;
a first bus to second bus bi-directional interface;
a third bus;
a third bus to first bus bi-directional interface connecting the third bus to the first bus; and
a third bus to second bus bi-directional interface connecting the third bus to the second bus.

2. The architecture of claim 1, further comprising a memory coupled to the first bus.

3. The architecture of claim 2, further comprising a second central processing unit, the second central processing unit having a first port coupled to the first bus and a second port coupled to the second bus.

4. The architecture of claim 3 wherein at least one of the first bus the second bus and the third bus is a bi-directional bus.

5. The architecture of claim 4 wherein at least one of the first bus to second bus bi-directional interface, the third bus to first bus bi-directional interface, and the third bus to second bus bi-directional interface comprises an open core protocol compliant interface.

6. The architecture of claim 5, wherein at least one of a group consisting of the first bus, the second bus and the third bus is connected to a memory.

7. The architecture of claim 5, wherein at least one of a group consisting of the first bus, the second bus and the third bus is a bi-directional bus.

8. The architecture of claim 5, further comprising a second central processing unit, the second central processing unit having a first port coupled to the first bus and a second port coupled to the second bus.

9. The architecture of claim 5, further comprising:
a fourth bus;
a fourth bus to first bus bi-directional interface connecting the fourth bus to the first bus;
a fourth bus to second bus bi-directional interface connecting the fourth bus to the second bus; and
a fourth bus to third bus-bi-directional interface connecting the fourth bus to the third bus.

10. The architecture of claim 9, further comprising:
a fifth bus; and
a fifth bus to second bus bi-directional interface connecting the fifth bus to the second bus.

11. A system on a chip architecture, comprising:
a first bi-directional bus;
a memory connected to the first bus;
a second bi-directional bus;
a central processing unit having a first port coupled to the first bi-directional bus and a second port coupled to the second bi-directional bus;
a first bi-directional bus to second bi-directional bus bi-directional interface; a third bi-directional bus;
a third bi-directional bus, to first bi-directional bus bi-directional interface connecting the third bus to the first bus; and
a third bi-directional bus to second bi-directional bus bi-directional interface connecting the third bus to the second bus.

12. The architecture of claim 11 further comprising:
a fourth bi-directional bus;
a fourth bi-directional bus to first bi-directional bus bi-directional interface connecting the fourth bi-directional bus to the first bi-directional bus;
a fourth bus to second bus bi-directional interface connecting the fourth bi-directional bus to the second bi-directional bus; and
a fourth bi-directional bus to third bi-directional bus-bi-directional interface connecting the fourth bi-directional bus to the third bi-directional bus.

13. The architecture of claim 12, further comprising:
a bi-directional fifth bus; and
a fifth bi-directional bus to second bus bi-directional interface connecting the fifth bi-directional bus to the second bi-directional bus.

14. The architecture of claim 13, further comprising a second central processing unit having a first port coupled to the first bus and a second port coupled to the second bus.

* * * * *